(12) United States Patent
Zhou

(10) Patent No.: US 11,602,031 B2
(45) Date of Patent: Mar. 7, 2023

(54) GROUNDED VOLTAGE PROTECTION CIRCUIT FOR A LINEAR DRIVE CIRCUIT

(71) Applicant: Wuxi ORG Microelectronics co., Ltd., Jiangsu (CN)

(72) Inventor: Zhicheng Zhou, Jiangsu (CN)

(73) Assignee: Wuxi ORG Microelectronics co., Ltd., Wuxi (CN)

( * ) Notice: Subject to any disclaimer, the term of this patent is extended or adjusted under 35 U.S.C. 154(b) by 201 days.

(21) Appl. No.: 16/930,267

(22) Filed: Jul. 15, 2020

(65) Prior Publication Data
US 2021/0022224 A1    Jan. 21, 2021

(51) Int. Cl.
H05B 45/50       (2022.01)
H05B 45/395      (2020.01)
H05B 45/54       (2020.01)

(52) U.S. Cl.
CPC .......... H05B 45/54 (2020.01); H05B 45/395 (2020.01)

(58) Field of Classification Search
CPC ...... H05B 45/00; H05B 45/30; H05B 45/395; H05B 45/50; H05B 45/54; H05B 45/37
See application file for complete search history.

(56) References Cited

U.S. PATENT DOCUMENTS

| | | | | |
|---|---|---|---|---|
| 10,609,773 | B1* | 3/2020 | Zhou | H05B 45/395 |
| 2003/0021129 | A1* | 1/2003 | Balakrishnan | G01R 31/40 |
| | | | | 363/21.01 |
| 2005/0093488 | A1* | 5/2005 | Hung | H05B 31/50 |
| | | | | 315/307 |
| 2010/0181833 | A1* | 7/2010 | Wu | H05B 45/3725 |
| | | | | 315/291 |
| 2012/0011009 | A1* | 1/2012 | Lindsey | G06Q 20/3274 |
| | | | | 705/17 |
| 2012/0081009 | A1* | 4/2012 | Shteynberg | H05B 45/46 |
| | | | | 315/122 |
| 2012/0248986 | A1* | 10/2012 | Gibbs | H05B 45/395 |
| | | | | 315/122 |
| 2015/0008826 | A1* | 1/2015 | Wu | H05B 45/3725 |
| | | | | 315/127 |

FOREIGN PATENT DOCUMENTS

| | | |
|---|---|---|
| CN | 106793363 A | 5/2017 |
| CN | 105706532 B | 11/2017 |

* cited by examiner

*Primary Examiner* — Thai Pham

(57) ABSTRACT

A grounded voltage protection circuit for a linear drive circuit includes an AC-DC power supply module, a first voltage protection module, an LED module, a drive IC and a linear current adjustment module. Through the cooperation of the first voltage protection module, the drive IC and the linear current adjustment module, when a DC voltage signal output by the AC-DC power supply module exceeds a first preset voltage value, the first voltage protection module outputs the first preset voltage signal to prevent the drive IC and the LED module from being damaged due to the overvoltage output by the AC-DC module, and avoid the transient impulse voltage in the entire voltage protection circuit, thereby enabling the voltage protection circuit to pass the CEC certification.

7 Claims, 4 Drawing Sheets

GROUNDED VOLTAGE PROTECTION CIRCUIT FOR A LINEAR DRIVE CIRCUIT

CROSS-REFERENCE TO RELATED APPLICATION

This application claims the benefit of priority from Chinese Patent Application No. 201910655230.4, filed on Jul. 19, 2019. The content of the aforementioned application, including any intervening amendments thereto, is incorporated herein by reference in its entirety.

TECHNICAL FIELD

The present application relates to circuit protection, and more particularly to a grounded voltage protection circuit for a linear drive circuit.

BACKGROUND

LED lighting products sold to North America need to comply with certain standards, such as California Energy Commission (CEC) regulations, which includes tests of ring wave and lightning surge for the common ground, and insulation voltage tests.

Linear LED lighting products generally adopt aluminum substrate as a bottom layer for heat dissipation, and an insulation layer for heat dissipation is provided between the aluminum substrate and a copper foil circuit layer. However, the parasitic capacitance effect forms in such heat dissipation insulation layer. In addition, the heat dissipation insulation layer is connected to the common ground, and the parasitic capacitance therein will cause a transient path and produce a transient high voltage, so the components in the circuit are damaged due to voltage shocks. This usually fails in the CEC testing.

SUMMARY

In view of this, the present invention provides a grounded voltage protection circuit for a linear drive circuit, comprising: an AC-DC power supply module configured to obtain an AC input voltage signal and convert the AC input voltage signal into a DC voltage signal;

an LED module comprising at least one LED string;

a first voltage protection module electrically connected to the AC-DC power supply module and the LED module, respectively;

a drive IC; and a linear current adjustment module electrically connected to the LED module;

wherein, when the DC voltage signal exceeds a first preset voltage value, the first voltage protection module outputs a first preset voltage signal; and when the DC voltage signal does not exceed the first preset voltage value, the first voltage protection module directly outputs the DC voltage signal;

the LED module is configured to receive the DC voltage signal output by the first voltage protection module to light the at least one LED string;

the drive IC is electrically connected to the AC-DC power supply module, the first voltage protection module and the linear current adjustment module respectively, and is configured to output a reference voltage and a control signal to the linear current adjustment module; and the linear current adjustment module is configured to adjust and control an output current of the LED module according to the reference voltage and the control signal.

Through the cooperation of the first voltage protection module, the drive IC and the linear current adjustment module, when the DC voltage signal exceeds the first preset voltage value, the first voltage protection module outputs the corresponding first preset voltage signal. When the AC-DC power supply module outputs a transient impulse voltage, the drive IC and the linear current adjustment module discharge the impulse voltage in time to prevent the driver IC and the LED module from being damaged due to the overload output voltage, so that the transient impulse voltage is avoided in the grounded voltage protection circuit, thereby enabling the grounded voltage protection circuit to pass the CEC regulations.

In an embodiment, the grounded voltage protection circuit further comprises a second voltage protection module, wherein the second voltage protection module is electrically connected to the linear current adjustment module and the LED module respectively, and is configured to output a second preset voltage signal to the linear current adjustment module to protect the linear current adjustment module when a voltage of a negative electrode of the LED module exceeds a second preset voltage value.

In an embodiment, the LED module comprises one LED string.

In an embodiment, the first voltage protection module comprises a first fast recovery diode and a first varistor, wherein a positive electrode of the first fast recovery diode is electrically connected to the AC-DC power supply module, and a negative electrode of the first fast recovery diode is electrically connected to the LED module and one end of the first varistor, and the other end of the first varistor is grounded.

In an embodiment, the LED module comprises a first LED string and a second LED string which are connected in series.

In an embodiment, the second voltage protection module comprises a transient voltage suppression diode, wherein a positive electrode of the transient voltage suppression diode is connected to the LED module, and a negative electrode of the transient voltage suppression diode is grounded.

In an embodiment, the second voltage protection module comprises a second varistor, wherein one end of the second varistor is connected to the LED module, and the other end of the second varistor is grounded.

In an embodiment, the first voltage protection module comprises a first fast recovery diode and a first varistor; a positive electrode of the first fast recovery diode is electrically connected to the AC-DC power supply module, and a negative electrode of the first fast recovery diode is electrically connected to a positive electrode of the first LED string and one end of the first varistor respectively, and the other end of the first varistor is grounded; and the second voltage protection module further comprises a third varistor; one end of the third varistor is electrically connected to a negative electrode of the first LED string and a positive electrode of the second LED string, and the other end of the third varistor is grounded.

In an embodiment, the AC-DC power supply module adopts a step-down regulator rectifier circuit, comprising a first step-down resistor, a fourth varistor and a rectifier bridge; wherein a first AC input terminal of the rectifier bridge is connected to a live wire of a power supply through the first step-down resistor, and a second AC input terminal of the rectifier bridge is connected to a neutral wire of the power supply; a first DC output terminal of the rectifier bridge is connected to the first voltage protection module; a second DC output terminal of the rectifier bridge is grounded; one end of the fourth varistor is respectively connected to the first step-down resistor and the first AC input terminal, and the other end of the fourth varistor is connected to the neutral wire of the power supply.

BRIEF DESCRIPTION OF THE DRAWINGS

The present disclosure will be described as follows with reference to the embodiments and accompanying drawings, from which features and advantages of the present disclosure will be apparent and easily understood.

DETAILED DESCRIPTION OF EMBODIMENTS

The present disclosure will be further described in detail below with reference to the accompanying drawings and embodiments, in which the same or similar reference numbers always indicate the same or similar elements or elements with the same or similar functions. The embodiments described below with reference to the accompany drawings are exemplary, which are intended to illustrate the present disclosure, but not to limit the protection scope of the present disclosure.

Figure 1:
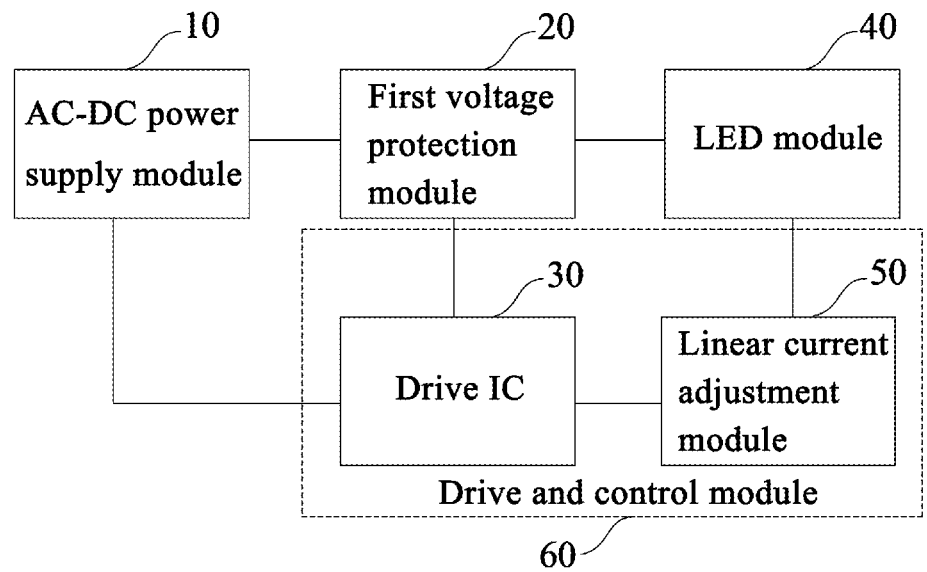
FIG. 1 is a block diagram of a grounded voltage protection circuit in a linear drive circuit according to an embodiment of the present disclosure.

FIG. 1 is a block diagram of a grounded voltage protection circuit in a linear drive circuit according to an embodiment of the present disclosure. The grounded voltage protection circuit includes an AC-DC power supply module 10, a first voltage protection module 20, a drive IC 30, an LED module 40, and a linear current adjustment module 50; where the first voltage protection module 20 is electrically connected to positive electrodes of the AC-DC power supply module 10 and the LED module 40, respectively; the drive IC 30 is electrically connected to the AC-DC power supply module 10, the first voltage protection module 20 and the linear current adjustment module 50, respectively; the linear current adjustment module 50 is electrically connected to a negative electrode of the LED module 40, and the LED module 40 includes at least at least one LED string.

Specifically, the AC-DC power supply module 10 is configured to obtain an AC input voltage signal and convert the AC input voltage signal into a corresponding DC voltage signal. When the DC voltage signal exceeds a first preset voltage value, the first voltage protection module 20 outputs a corresponding first preset voltage signal; and when the DC voltage signal does not exceed the first preset voltage value, the first voltage protection module 20 directly outputs the DC voltage signal. The LED module 40 is configured to receive the corresponding voltage signal output by the first voltage protection module to light the at least one LED string. The drive IC 30 is configured to output a reference voltage and a control signal to the linear current adjustment module 50. The linear current adjustment module 50 is configured to adjust and control an output current of the LED module 40 according to the reference voltage and the control signal.

Specifically, the AC-DC power supply module 10 generally converts an AC input voltage of 120 V or 220 V into a corresponding DC voltage signal.

Specifically, as shown in FIG. 1, the linear current adjustment module 50 may be integrated in the driver IC 30 to achieve current adjustment. In this case, the linear current adjustment module 50 and the driver IC 30 can be regarded as a "drive and control module 60".

In the above-mentioned grounded voltage protection circuit, through the cooperation of the first voltage protection module 20, the drive IC 30 and the linear current adjustment module 50, when the DC voltage signal exceeds the first preset voltage value, the first voltage protection module 20 outputs the corresponding first preset voltage signal. When the AC-DC power supply module 10 outputs a transient impulse voltage, the drive IC 30 and the linear current adjustment module 50 discharge the impulse voltage in time to prevent the drive IC 30 and the LED module 40 from being damaged due to the overload output voltage, so that the transient impulse voltage is avoided in the grounded voltage protection circuit, thereby enabling the grounded voltage protection circuit to pass the CEC certification.

Figure 2:
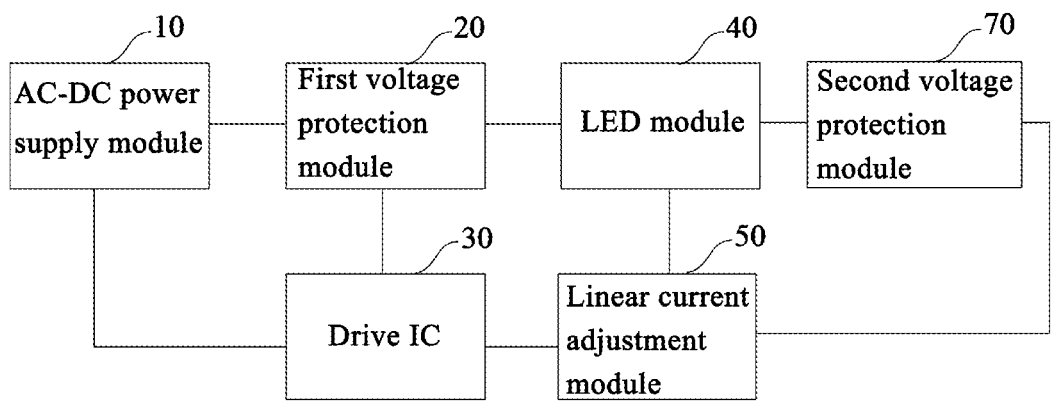
FIG. 2 is a block diagram of the grounded voltage protection circuit in a linear drive circuit according to another embodiment of the present disclosure.

In an embodiment, as shown in FIG. 2, the grounded voltage protection circuit further includes a second voltage protection module 70 which is electrically connected to the linear current adjustment module 50 and the LED module 40 respectively, and is configured to output a second preset voltage signal to the linear current adjustment module 50 to protect the linear current adjustment module 50 when a voltage of the negative electrode of the LED module 40 exceeds a second preset voltage value.

The second voltage protection module 70 is provided for preventing an impact of an excessively high voltage generated by the grounded voltage protection circuit on the linear current adjustment module 50 when the transient impulse voltage is applied, thereby providing voltage protection for the linear current adjustment module 50.

In an embodiment, the LED module 40 includes a LED string.

Figure 3:
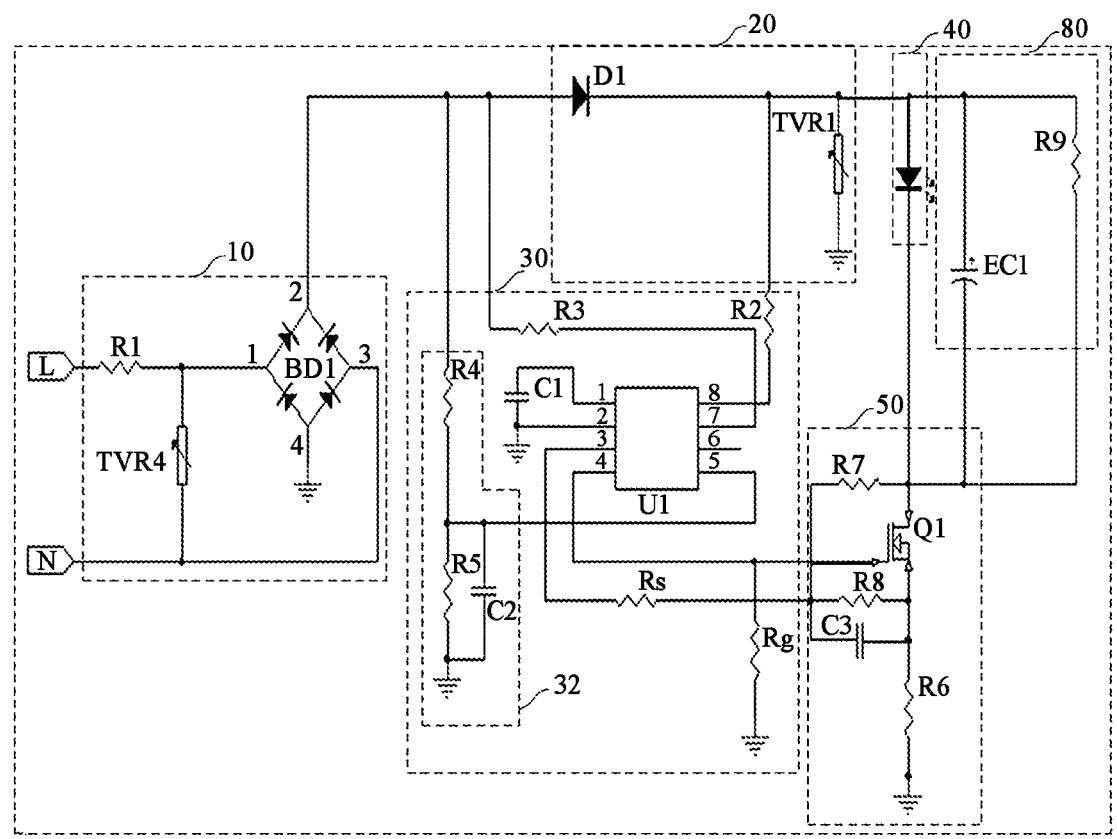
FIG. 3 is a circuit diagram of a grounded voltage protection circuit in a linear drive circuit according to an embodiment of the present disclosure.

In an embodiment, as show in FIG. 3, the first voltage protection module 20 includes a first fast recovery diode D1 and a first varistor TVR1. A positive electrode of the first fast recovery diode D1 is electrically connected to the AC-DC power supply module 10, and a negative electrode of the first fast recovery diode D1 is electrically connected to a positive electrode of the LED module 40 and one end of the first varistor TVR1, respectively, and the other end of the first varistor TVR1 is grounded.

Specifically, in the embodiment as shown in FIG. 3, the AC-DC power supply module 10 adopts a step-down regulator rectifier circuit, including a first step-down resistor R1, a fourth varistor TVR4 and a rectifier bridge BD1; where a first AC input terminal 1 of the rectifier bridge BD1 is connected to a line wire L of a power supply through the first step-down resistor R1, and a second AC input terminal 3 of the rectifier bridge is connected to a neutral wire N of the power supply; a first DC output terminal 2 of the rectifier bridge BD1 is connected to the first voltage protection module 20; a second DC output terminal 4 of the rectifier bridge BD1 is grounded; one end of the fourth varistor TVR4 is respectively connected to the first step-down resistor R1 and the first AC input terminal 1, and the other end of the fourth varistor TVR4 is connected to the neutral wire N of the power supply.

Specifically, the drive IC 30 includes a reference voltage control module 32 and a drive chip U1, where the reference voltage control module 32 includes a first voltage dividing resistor R4, a second voltage dividing resistor R5 and a second capacitor C2. The first voltage dividing resistor R4 and the second voltage dividing resistor R5 is connected in series in sequence. One end of the first voltage dividing resistor R4 is electrically connected to the first DC output terminal 2 and the positive electrode of the fast recovery diode D1. The second voltage dividing resistor R5 and the second capacitor C2 are connected in parallel; after the parallel connection, one end of the second voltage dividing resistor R5 is grounded, and the other end is respectively connected to the first voltage dividing resistor R4 and a fifth pin 5 of the drive chip U1 for controlling the reference voltage.

Specifically, a first pin 1 of the drive chip U1 is connected to one end of the first capacitor C1, and the other end of the first capacitor C1 is grounded; and a second pin 2 of the drive chip U1 is grounded.

Specifically, an eighth pin 8 of the drive chip U1 is connected to a negative electrode of the first fast recovery diode D1 through a high voltage startup resistor R2. The eighth pin 8 is a high voltage startup pin, and a seventh pin 7 of the drive chip U1 is connected to a positive electrode of the first fast recovery diode D1 through a first current limiting resistor R3.

Specifically, the drive chip U1 starts up when a voltage of the eighth pin 8 exceeds a preset voltage start value.

Specifically, a third pin 3 of the drive chip U1 is connected to the linear current adjustment module 50 through a second step-down resistor Rs, and is configured to provide a reference voltage Vref to the linear current adjustment module 50 through one end of the second step-down resistor Rs.

Specifically, the linear current adjustment module 50 includes a MOS switch tube Q1, where a gate of the MOS switch tube Q1 is connected to a fourth pin 4 of the drive chip U1, and is grounded through a first grounding resistor Rg. The fourth pin 4 of the drive chip U1 is an output terminal of the drive chip U1. A source of the MOS switch tube Q1 is grounded through a second grounding resistor R6. One end of a drain of the MOS switch tube Q1 is connected to the LED module 40, and the other end of the drain of the MOS switch tube Q1 is connected to a non-grounded end of the second grounding resistor R6 through a first shunt resistor R7 and a second shunt resistor R8 connected in series. A third capacitor C3 is connected to both ends of the second shunt resistor R8 in parallel, where after the parallel connection, one end of the second shunt resistor R8 is connected to the non-grounded end of the second grounding resistor R6, and the other end is connected to one end of the second step-down resistor Rs for receiving the reference voltage Vref output by the second step-down resistor Rs.

Specifically, another current loop is formed through the LED module 40, the first shunt resistor R7 and the second shunt resistor R8. When the output voltage of the negative electrode of the LED module 40 (i.e., the voltage of the drain of the MOS switch tube Q1) increases, since the reference voltage Vref remains unchanged, the voltage of the second grounding resistor R6 decreases and the current thereof decreases accordingly. The current of the second grounding resistor R6 can be regarded as being equal to the current of the LED module 40, and thus the current of the LED module 40 decreases correspondingly, so that the LED module 40 is protected.

Specifically, when the LED module 40 is short-circuited, the reference voltage Vref momentarily increases, so that the drive IC 30 turns off the MOS switch tube Q1 in time, and the corresponding small current passes through the first shunt resistor R7, the second shunt resistor R8 and the second grounding resistor R6 to form a current loop to prevent the MOS switch tube Q1 from being burned out.

Obviously, the linear current adjustment module 50 further improves a safety of each component in the grounded voltage protection circuit under the transient impulse voltage.

In an embodiment, as shown in FIG. 3, the LED module 40 is further connected in parallel to an anti-flash module 80. The anti-flash module 80 includes a fourth capacitor EC1 and a first resistor R9 connected in parallel to the LED module 40 respectively, where the fourth capacitor EC1 is configured for filtering. The anti-flash module 80 is configured to form a current bleed circuit with the LED module 40 and the first resistor R9 to prevent the LED module 40 from flashing when the LED module 40 stops working.

Figure 4:
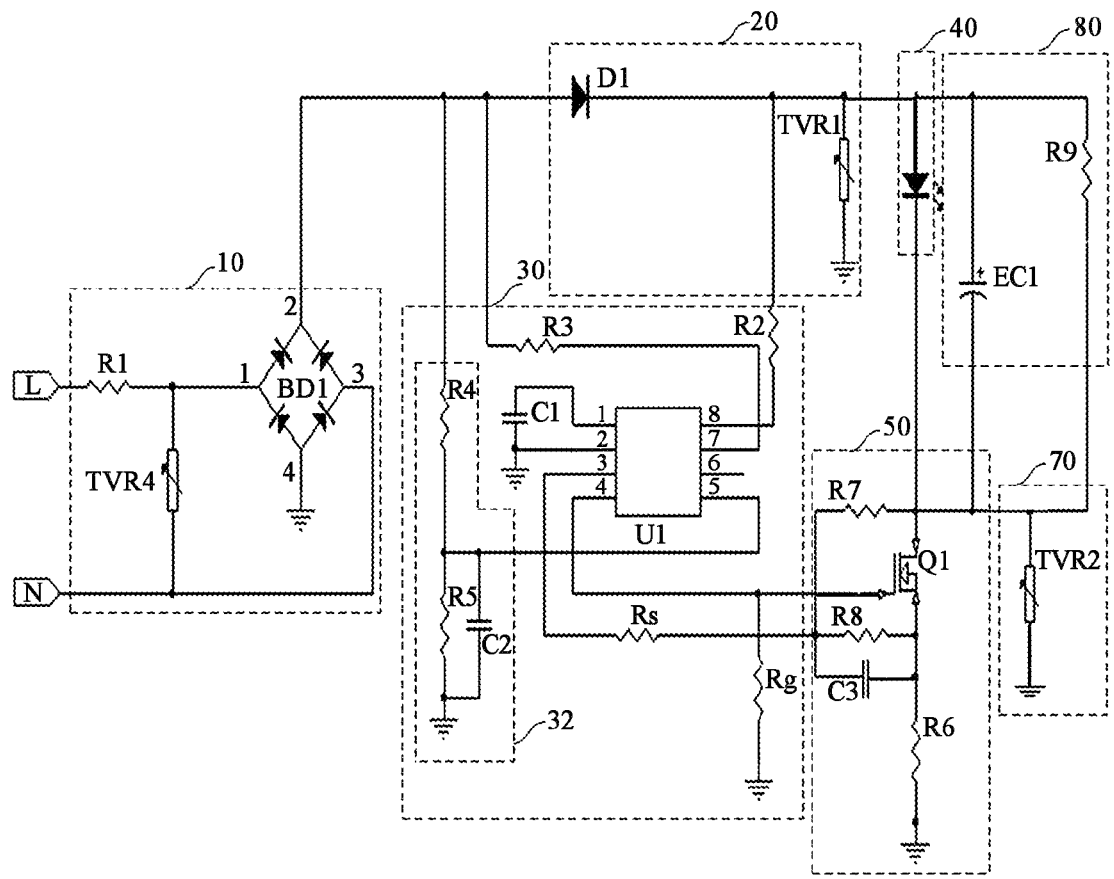
FIG. 4 is a circuit diagram of the grounded voltage protection circuit in a linear drive circuit according to another embodiment of the present disclosure.

In an embodiment, as shown in FIG. 4, the second voltage protection module 70 includes a second varistor TVR2, where one end of the second varistor TVR2 is electrically connected to the linear current adjustment module 50 and the negative electrode of the LED module 40 respectively, and the other end of the second varistor TVR2 is grounded.

In an embodiment, the LED module 40 comprises a first LED string and a second LED string connected in series.

In an embodiment, the second voltage protection module 70 comprises a transient voltage suppression diode, wherein a positive electrode of the transient voltage suppression diode is connected to the negative electrode of the LED module 40, and a negative electrode of the transient voltage suppression diode is grounded.

Figure 5:
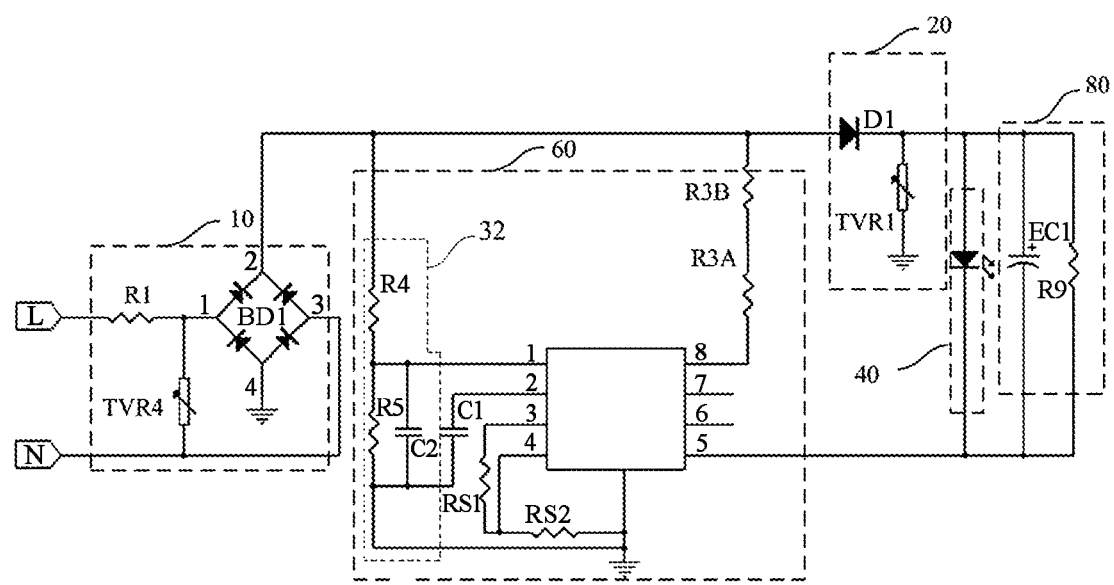
FIG. 5 is a circuit diagram of the grounded voltage protection circuit in a linear drive circuit according to yet another embodiment of the present disclosure.

In an embodiment, as shown in FIG. 5, the linear current adjustment module 50 and the drive IC 30 shown in FIG. 3 are integrated (the linear current adjustment module 50 is usually integrated inside the drive IC 30) to obtain the drive and control module 60, and the remaining circuit structure in the embodiment of FIG. 3 remains unchanged. In this embodiment, the function of the drive and control module 60 is equivalent to the function performed by the linear current adjustment module 50 and the drive IC 30 in the embodiment shown in FIG. 3. The function of each of the pins of the drive and control module 60 is described as follows: the first pin 1 is connected to one end of the reference voltage control module 32 and the first capacitor C1 respectively, and the other end of the reference voltage control module 32 is grounded; and the second pin 2 is grounded through the first capacitor C1. Moreover, the structure of the reference voltage control module 32 is the same as a corresponding structure in the illustrated embodiment shown in FIG. 3.

Specifically, a third grounding resistor RS2 in FIG. 5 is equivalent to the second grounding resistor R6 in the embodiment shown in FIG. 3. Since the linear current adjustment module 50 is integrated inside the drive IC 30, the fifth pin 5 is equivalent to the output terminal of the linear current adjustment module 50 in the embodiment shown in FIG. 3, and is connected to the negative electrode of the LED module 40. The fourth pin 4 is grounded through the third grounding resistor RS2, and the fourth pin 4 is internally connected to the source of the MOS switch tube in the linear current adjustment module 50. The eighth pin 8 is connected to the positive electrode of the LED module 40 through a third voltage dividing resistor R3A and a fourth voltage dividing resistor R3B, where the third voltage dividing resistor R3A and the fourth voltage dividing resistor R3B are connected in series. The third pin 3 is grounded through a resistor RS1 and the third grounding resistor RS2, where the resistor RS1 and the third grounding resistor RS2 connected in series. The third pin 3 cooperates with the third voltage dividing resistor R3A and the fourth voltage dividing resistor R3B connected to the eighth pin 8 to form a loop for maintaining current. When the LED module 40 does not work, a current which is equal to the voltage of the third pin 3/the resistances of RS1+RS2 will be provided through the third pin 3. When the LED module 40 works, since the voltage of the fourth pin 4 is higher than the voltage of the third pin 3, the loop for maintaining current will be automatically cut off, so that only the drive current loop flowing through the LED module 40 is left, where the drive current is equal to the voltage of the fourth pin 4/the resistance of RS2. The drive current loop ensures sufficient bleeder current when the above-mentioned grounded voltage protection circuit is connected to a thyristor dimming low power circuit.

Figure 6:
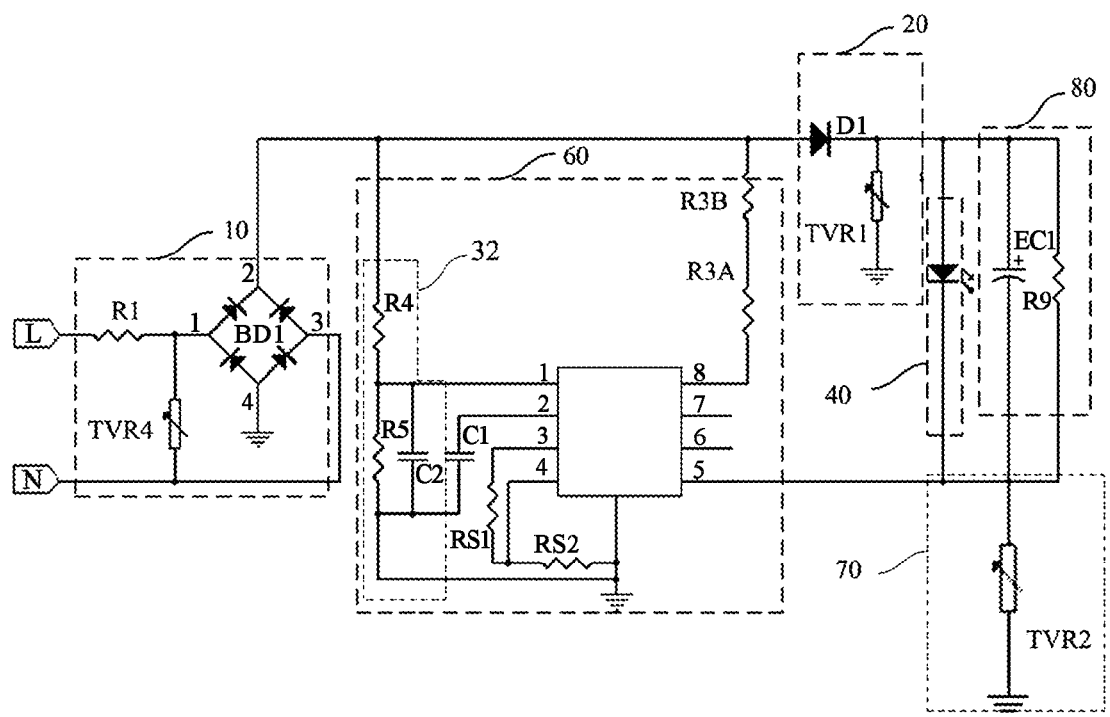
FIG. 6 is a circuit diagram of the grounded voltage protection circuit in a linear drive circuit according to still another embodiment of the present disclosure.

In an embodiment, as shown in FIG. 6, a second voltage protection module 70 may be added to voltage protection circuit shown in FIG. 5. The circuit structure of the second voltage protection module 70 is the same as the circuit structure of the second voltage protection module 70 in the embodiment as shown in FIG. 4. The voltage protection module 70 adopts a second varistor TVR2, where one end of the second varistor TVR2 is connected to a negative electrode of the LED module 40, and the other end of the second varistor TVR2 is grounded.

Figure 7:
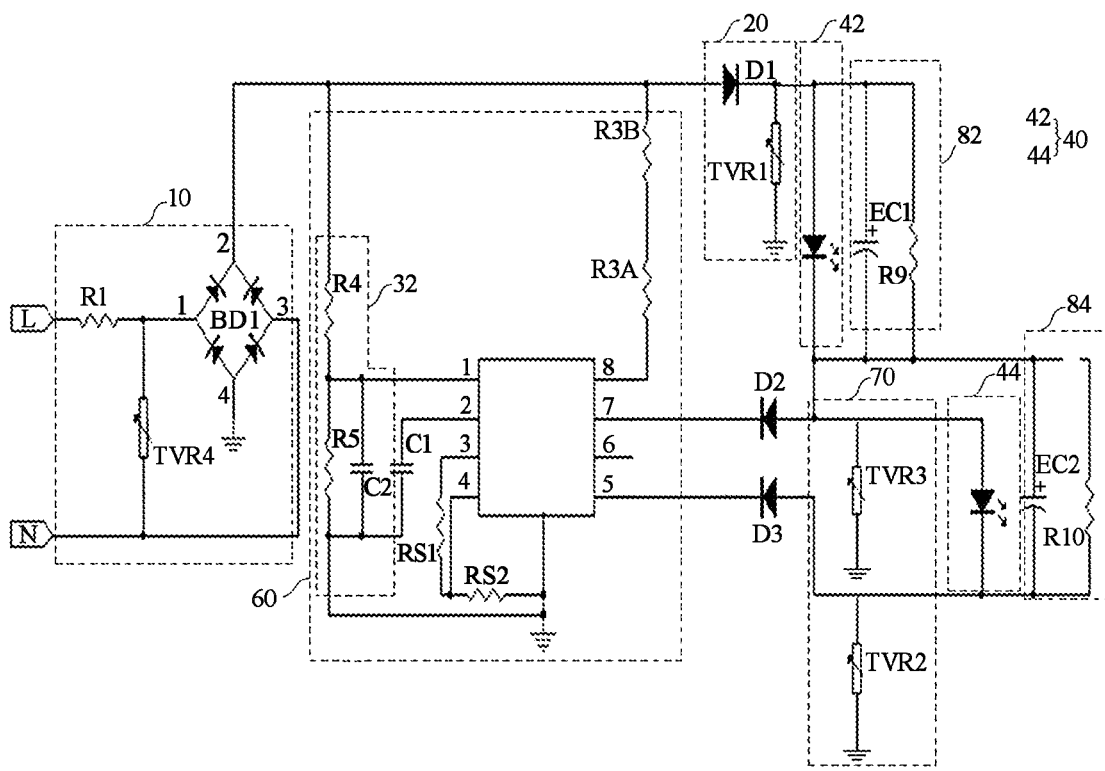
FIG. 7 is a circuit diagram of grounded voltage protection circuit in a linear drive circuit according to yet still another embodiment of the present disclosure.

In an embodiment, as shown in FIG. 7, the LED module includes a first LED string 42 and a second LED string 44. The first voltage protection module 20 includes a first fast recovery diode D1 and a first varistor TVR1, where a positive electrode of the first fast recovery diode D1 is electrically connected to the AC-DC power supply module 10, and a negative electrode of the first fast recovery diode D1 is electrically connected to a positive electrode of the first LED string 42 and one end of the first varistor TVR1, and the other end of the first varistor TVR1 is grounded.

Further, as shown in FIG. 7, the second voltage protection module 70 further includes a third varistor TVR3, where one end of the third varistor TVR3 is electrically connected to a negative electrode of the first LED string 42 and a positive electrode of the second LED string 44 respectively, and the other end of the third varistor TVR3 is grounded.

Specifically, the negative electrode of the first LED string 42 is further connected to the seventh pin 7 of the drive and control module 60 through the second fast recovery diode D2, and a negative electrode of the second LED string 44 is further connected to the fifth pin 5 of the drive and control module 60 through a third fast recovery diode D3, so that the drive and control module 60 is protected through the second fast recovery diode D2 and the third fast recovery diode D3.

Further, as shown in FIG. 7, the first LED string 42 connects in parallel with a first anti-flash module 82 including a fourth capacitor EC1 and a first resistor R9 connected in parallel with the first LED string 42 respectively, and the second LED string 44 connects in parallel with a second anti-flash module 84 including a fifth capacitor EC2 and a second resistor R10 connected in parallel with the second LED string 44 respectively. The circuit structures and functions of the first anti-flash module 82 and the second anti-flash module 84 are the same as that of the anti-flash module 80, which will not be repeated herein.

In an embodiment, on the basis of the first voltage protection circuit 20, the second voltage protection circuit 70 can be provided with the second varistor TVR2 and the third varistor TVR3 at the same time, both of which can discharge the high voltage in the circuit in time, so that components in the grounded voltage protection circuit are not damaged due to the transient impulse voltage, thereby enabling the grounded voltage protection circuit to pass the CEC certification.

In the present disclosure, the terms "one embodiment", "some embodiments", "examples", "specific examples", or "some examples" indicate specific features, structures, materials or characteristics described in conjunction with the embodiments or examples are included in at least one embodiment or example of the present disclosure. In this disclosure, the above-mentioned terms do not necessarily refer to the same embodiment or example. Moreover, the specific features, structures, materials, or characteristics described may be combined in any suitable manner in any one or more embodiments or examples.

Described above are only preferred embodiments of the present disclosure. It should be understood that the above-mentioned embodiments are exemplary, but not intended to limit the present disclosure. Any change, modification, replacement and variation made by those skilled in the art without departing from the principle and spirit of the present disclosure shall fall within the scope of the appended claims.

What is claimed is:

1. A grounded voltage protection circuit, comprising:
an alternating current to direct current (AC-DC) power supply module configured to obtain an alternating current (AC) input voltage and convert the AC input voltage into a direct current (DC) voltage;
a light emitting diode (LED) module comprising at least one LED string;
a first voltage protection module electrically connected to the AC-DC power supply module and the LED module, respectively;
a drive integrated circuit (IC); and
a linear current adjustment module electrically connected to the LED module;
wherein the first voltage protection module is configured to output a first preset voltage when the DC voltage exceeds the first preset voltage, and the first voltage protection module is configured to output the DC voltage when the DC voltage does not exceed the first preset voltage;
the LED module is configured to receive the DC voltage output by the first voltage protection module to light the at least one LED string;
the drive IC is electrically connected to the AC-DC power supply module, the first voltage protection module and the linear current adjustment module respectively, and is configured to output a reference voltage and a control signal to the linear current adjustment module;
the linear current adjustment module is configured to adjust and control an output current of the LED module according to the reference voltage and the control signal; and
the grounded voltage protection circuit further comprises a second voltage protection module, wherein the second voltage protection module is electrically connected to the linear current adjustment module and the LED module respectively, and the second voltage protection module is configured to output a second preset voltage to the linear current adjustment module to protect the linear current adjustment module when a voltage of a negative electrode of the LED module exceeds the second preset voltage.

2. The grounded voltage protection circuit of claim 1, wherein the LED module comprises one LED string.

3. The grounded voltage protection circuit of claim 1, wherein the LED module comprises a first LED string and a second LED string which are connected in series.

4. The grounded voltage protection circuit of claim 3, wherein the second voltage protection module comprises a second varistor; one end of the second varistor is electrically connected to the linear current adjustment module and the LED module respectively, and the other end of the second varistor is grounded.

5. The grounded voltage protection circuit of claim 4, wherein the first voltage protection module comprises a fast recovery diode and a first varistor; a positive electrode of the first fast recovery diode is electrically connected to the AC-DC power supply module, and a negative electrode of the first fast recovery diode is electrically connected to a positive electrode of the first LED string and one end of the first varistor respectively; and the other end of the first varistor is grounded; and the second voltage protection module further comprises a third varistor; one end of the third varistor is electrically connected to a negative electrode of the first LED string and a positive electrode of the second LED string, and the other end of the third varistor is grounded.

6. The grounded voltage protection circuit of claim 1, wherein the second voltage protection module comprises a transient voltage suppression diode; a positive electrode of the transient voltage suppression diode is connected to the LED module, and a negative electrode of the transient voltage suppression diode is grounded.

7. A grounded voltage protection circuit, comprising:
an alternating current to direct current (AC-DC) power supply module configured to obtain an alternating current (AC) input voltage and convert the AC input voltage into a direct current (DC) voltage;
a light emitting diode (LED) module comprising at least one LED string;
a first voltage protection module electrically connected to the AC-DC power supply module and the LED module, respectively;
a drive integrated circuit (IC); and
a linear current adjustment module electrically connected to the LED module;
wherein the first voltage protection module is configured to output a first preset voltage when the DC voltage exceeds the first preset voltage, and the first voltage protection module is configured to output the DC voltage when the DC voltage does not exceed the first preset voltage;
the LED module is configured to receive the DC voltage output by the first voltage protection module to light the at least one LED string;
the drive IC is electrically connected to the AC-DC power supply module, the first voltage protection module and the linear current adjustment module respectively, and is configured to output a reference voltage and a control signal to the linear current adjustment module;
the linear current adjustment module is configured to adjust and control an output current of the LED module according to the reference voltage and the control signal; and
the first voltage protection module comprises a first fast recovery diode and a first varistor, wherein a positive electrode of the first fast recovery diode is electrically connected to the AC-DC power supply module, and a negative electrode of the first fast recovery diode is electrically connected to the LED module and one end of the first varistor, and the other end of the first varistor is grounded.

* * * * *